United States Patent
Kennedy et al.

(10) Patent No.: US 7,085,729 B1
(45) Date of Patent: Aug. 1, 2006

(54) SYSTEM AND METHOD FOR ALLOCATING MANUFACTURED PRODUCTS TO SELLERS

(75) Inventors: Brian M. Kennedy, Coppell, TX (US); Christopher D. Burchett, Carrollton, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/504,247

(22) Filed: Feb. 15, 2000

Related U.S. Application Data

(63) Continuation of application No. 08/802,434, filed on Feb. 18, 1997, now Pat. No. 6,167,380, which is a continuation-in-part of application No. 08/491,167, filed on Jun. 16, 1995.

(51) Int. Cl.
  *G06F 153/00* (2006.01)
(52) U.S. Cl. ........................................ 705/10
(58) Field of Classification Search .......... 705/1, 705/10, 22, 28, 29
See application file for complete search history.

(56) References Cited

U.S. PATENT DOCUMENTS

| | | | |
|---|---|---|---|
| 4,209,845 A | 6/1980 | Berger et al. | 364/900 |
| 4,611,280 A | 9/1986 | Linderman | 364/300 |
| 4,611,310 A | 9/1986 | Durbin | 365/230 |
| 4,737,910 A | 4/1988 | Kimbrow | 364/403 |
| 4,827,423 A | 5/1989 | Beasley et al. | 364/468 |
| 4,992,940 A | 2/1991 | Dworkin | 364/401 |
| 5,041,972 A | 8/1991 | Frost | 364/401 |
| 5,089,970 A | 2/1992 | Lee et al. | 364/468 |
| 5,101,352 A | 3/1992 | Rembert | 364/401 |
| 5,128,861 A | 7/1992 | Kagami et al. | |

(Continued)

FOREIGN PATENT DOCUMENTS

EP   0 025 405 A1   5/1980

(Continued)

OTHER PUBLICATIONS

"Concentra and i2 technologies to integrate sales configuration with global supply chain management; Product configuration recognized as critical link in intelligent global supply chain management", Business Wire p10101141, Oct. 19, 1995, Dialog fi.*

(Continued)

*Primary Examiner*—Frantzy Poinvil
(74) *Attorney, Agent, or Firm*—Brian E. Harris; James E. Walton

(57) ABSTRACT

A software system is provided for managing available to promise (ATP) and making promises to fulfill customer requests. The software system includes a plurality of generic product models (600) each representing a generic product. Each generic product model (600) specifies one component of a plurality of possible components. A plurality of specific product models (602) each represent a specific product and each specify all components of the specific product. Each component specified by each specific product model (602) is specified by one of the generic product models (600) such that each specific product model (602) is related to a subset of the generic product models (600). A customer request matching a specific product then can be fulfilled by available-to-promise of the specific product or by available-to-promise of all related generic products. In addition, an organization in a seller hierarchy can retain product and designate first-come-first-served product. The organization also can define an ATP horizon to specify when forecasted product is actually available. Further, the organization can use an automatic allocation policy to allocate to members, and some forecast entries can be designated zero-ATP entries.

33 Claims, 6 Drawing Sheets

U.S. PATENT DOCUMENTS

| | | | |
|---|---|---|---|
| 5,148,370 A | 9/1992 | Litt et al. | 364/468 |
| 5,175,857 A | 12/1992 | Inoue | 395/800 |
| 5,216,612 A | 6/1993 | Cornett et al. | 364/468 |
| 5,218,700 A | 6/1993 | Beechick | 395/700 |
| 5,233,533 A | 8/1993 | Edstrom et al. | 364/468 |
| 5,237,496 A | 8/1993 | Kagami et al. | 364/401 |
| 5,280,425 A | 1/1994 | Hogge | 364/402 |
| 5,303,144 A | 4/1994 | Kawashima et al. | 364/401 |
| 5,305,199 A | 4/1994 | LoBiondo et al. | 364/403 |
| 5,321,833 A | 6/1994 | Chang et al. | 395/600 |
| 5,343,388 A | 8/1994 | Wedelin | 364/402 |
| 5,369,570 A | 11/1994 | Parad | 364/401 |
| 5,570,291 A | 10/1996 | Dudle et al. | 364/468.01 |
| 5,594,639 A | 1/1997 | Atsumi | 364/468.14 |
| 5,630,070 A | 5/1997 | Dietrich et al. | 395/208 |
| 5,712,985 A | 1/1998 | Lee et al. | 395/207 |
| 5,712,989 A | 1/1998 | Johnson et al. | 395/228 |
| 5,715,444 A | 2/1998 | Danish et al. | 395/604 |
| 5,758,329 A | 5/1998 | Wojcik et al. | 705/28 |
| 5,765,143 A | 6/1998 | Sheldon et al. | 705/28 |
| 5,809,144 A | 9/1998 | Sirbu et al. | 380/25 |
| 5,826,260 A | 10/1998 | Byrd, Jr. et al. | 707/5 |
| 5,845,258 A | 12/1998 | Kennedy | 705/8 |
| 5,854,746 A * | 12/1998 | Yamamoto et al. | 700/106 |
| 5,873,076 A | 2/1999 | Barr et al. | 707/3 |
| 5,918,213 A | 6/1999 | Bernard et al. | 705/26 |
| 5,960,414 A | 9/1999 | Rand et al. | 705/28 |
| 5,963,920 A | 10/1999 | Rose et al. | 705/28 |
| 5,963,953 A | 10/1999 | Cram et al. | 707/102 |
| 5,970,474 A | 10/1999 | LeRoy et al. | 705/27 |
| 5,979,757 A | 11/1999 | Tracy et al. | 235/383 |
| 5,995,947 A | 11/1999 | Fraser et al. | 705/38 |
| 5,999,908 A | 12/1999 | Abelow | 705/1 |
| 6,009,406 A | 12/1999 | Nick | 405/10 |
| 6,009,407 A | 12/1999 | Garg | 705/10 |
| 6,012,041 A | 1/2000 | Brewer et al. | 705/28 |
| 6,012,051 A | 1/2000 | Sammon, Jr. et al. | 706/52 |
| 6,016,504 A | 1/2000 | Arnold et al. | 709/200 |
| 6,035,305 A | 3/2000 | Strevey et al. | 707/104 |
| 6,049,777 A | 4/2000 | Sheena et al. | 705/10 |
| 6,055,519 A | 4/2000 | Kennedy et al. | 705/80 |
| 6,064,980 A | 5/2000 | Jacobi et al. | 705/26 |
| 6,085,165 A | 7/2000 | Ulwick | 705/7 |
| 6,085,170 A | 7/2000 | Tsukuda | 705/26 |
| 6,167,380 A | 12/2000 | Kennedy et al. | 705/10 |
| 6,167,383 A | 12/2000 | Henson | 705/26 |
| 6,188,989 B1 | 2/2001 | Kennedy | 705/8 |
| 6,195,652 B1 | 2/2001 | Fish | 707/2 |
| 6,226,652 B1 | 5/2001 | Percival | 707/203 |
| 6,249,774 B1 | 6/2001 | Roden et al. | 705/28 |
| 6,321,133 B1 | 11/2001 | Smirnov et al. | 700/100 |
| 6,324,522 B1 | 11/2001 | Peterson et al. | 705/28 |
| 6,463,345 B1 | 10/2002 | Peachey-Kountz et al. | 700/99 |
| 6,484,165 B1 | 11/2002 | Beall et al. | 707/3 |
| 6,505,172 B1 | 1/2003 | Johnson et al. | 705/27 |
| 6,519,648 B1 | 2/2003 | Eyal | 709/231 |
| 6,567,820 B1 | 5/2003 | Scheifler et al. | 707/103 |
| 6,601,043 B1 | 7/2003 | Purcell | 705/26 |
| 2001/0044769 A1 | 11/2001 | Chavez | 705/37 |
| 2001/0047285 A1 | 11/2001 | Borders | 705/8 |
| 2002/0013721 A1 | 1/2002 | Dabbiere et al. | 705/7 |
| 2002/0019761 A1 | 2/2002 | Lidlow | 705/10 |
| 2002/0029168 A1 | 3/2002 | McConnell Jr. et al. | 705/26 |
| 2002/0049622 A1 | 4/2002 | Lettich et al. | 705/7 |
| 2002/0082931 A1 | 6/2002 | Siegel et al. | 705/26 |

FOREIGN PATENT DOCUMENTS

| | | |
|---|---|---|
| EP | 231552 | 8/1987 |
| EP | 0 425 405 | 5/1991 |
| EP | 425405 | 5/1991 |
| EP | 463616 | 1/1992 |
| EP | 466089 | 1/1992 |
| EP | 466090 | 1/1992 |
| EP | 615198 | 9/1994 |
| EP | EPA 615198 A1 * | 9/1994 |
| GB | 2293902 | 10/1996 |
| WO | WO 00/17795 | 3/2000 |

OTHER PUBLICATIONS

Smith, F., et al., "Dun & Bradstreet Software Delivers Sales and Promotion System to Manufacturers," Business Wire; s1, p. 1, Jun. 11, 1990.

Castagna, R., et al., "A Model for Evaluating Manufacturing System Time Performances," Integrated Manufacturing Systems, v 3, n 3, pp. 15-21, 1992.

Foxlow, T.; "Knowledge-Based Manufacturing: The Key to Recovery," Logistics Information Management, v 7, n 4, pp. 23-26, 1994.

Parker, K., "Demand Management and Beyond," Manufacturing Systems Supply-Chain Strategies: Forecasting and Demand Management Supplement, pp. 2A-14A.

Marilyn K,. McClelland, "Using Simulation to Facilitate Analysis of Manufacturing Strategy", Journal of Business Logistics, vol. 13, No. 1, pp. 215-237, 1992.

David M. McClutheon, et al., "The Customization-Responsiveness Squeeze," Sloan Management Review, vol. 35, No. 2, pp. 89-99.

Anonymous, Dialog File 148, No. 8283166, Concentra and i2 Technologies to integrate sales configuration with global supply chain management; Product configuration recognized as critical link in intelligent global supply chain management, Business Wire, 2 pages, Oct. 10, 1995.

Anonymous, MRP upstaged (One trend in the software industry is that the top enterprise-resource-planning software companies are outright supplanting the core planning functions of their manufacturing-resource planning (MRP II) systems or are augmenting them with new scheduling software that provides real-time decision support), Industry Week, v. 246, n. 3, 4 pages, Feb. 3, 1997.

Notification of Transmittal of International Preliminary Examination Report, Oct. 24, 2000.

PCT Notification of Transmittal of the International Search Report or the Declaration, 4 pages, May 12, 2001.

Rhodes, D.; The Keys to the Enterprise: Integrated Applications Drive Information Systems to New Horizons; HP Professional, v5, n11, p. 44(e), Nov. 1991.

Smith, F. et al.; Dun & Bradstreet Software Delivers Sales and Promotion System to Manufacturers; Business Wire; s1, p. 1, Jun. 11, 1990.

Parker, Kevin; Demand Management and Beyond; Manufacturing Systems Supply-Chain Strategies: Forecasting and Demand Management Supplement, pp. 2A-14A, Jun. 1996.

D. Davis, "Tough Customers," Manufacturing Systems, Wheaton, 6 pages, Nov. 1994.

A. Greene, et al., "MRP II: Out with the Old . . . ; Available: Real-Time EDI, Multiplant Functions, More; MRP II Software Systems; How to Negotiate the Right Price," Computerworld, Framingham, 7 pages, Jun. 8, 1992.

Anonymous, "Intelligent Manufacturing Report", Intelligent Manufacturing, vol. 1, No. 3, 3 pages, Mar. 1995.

C.J. Cavallaro, Dialog file 621 (Gale Group New Prod. Annou. (R)), No. 1007808, "New Para Research MRP II System Adapts Itself to your Business", PR Newswire, 4 pages, Aug. 13, 1985.

O. Morton, "The uses of time," The Economist, London, V. 330, Issue 7853, 4 pages, Mar. 5, 1994.

K. Parker, "What new tools will best tame time?," Manufacturing Systems; Wheaton, vol. 12, Issue 1, 6 pages, Jan. 1994.

B.M. Kennedy, "Managing Data Associated with Available-to-Promise (ATP) Products," U.S. Appl. No. 09/510,607, pending, Feb. 22, 2000.

A.C. Kapadia, et al., "System and Method for Promising Delivery of Configured Products with Selected Optimizations," U.S. Appl. No. 09/333,894, pending, Jun. 14, 1999.

A.C. Kapadia, et al., "System and Method for Promising Delivery of Configured Products," U.S. Appl. No. 09/333,895, pending, Jun. 14, 1999.

Foxlow, Tim; Knowledge-Based Manufacturing: The Key to Recovery, Logistics Information Management, v7, n4, pp. 23-26, 1994.

Castagna, Romeo; A Model for Evaluating Manufacturing System Time by Performances, Integrated Manufacturing Systems, v3, n3, pp. 15-21, 1992.

Allen, Supply Chain Management Software, May 1998, University of Texas, Austin http://esallen.home.mindspring.com/erp.SCH.htm, May 1998.

Available to Promise (ATP) http://sandbox.aiss.uiuc.edu/oracle/nca/mrp.atp.htm, Date Unknown.

carmax.com, webpages dated prior to Mar. 2, 2001 retrieved from archive.org, 10 pages, Date Unknown.

Funaki, et al., "Method and System for Production Planning Transaction," JP02001331693A, EAST Version 1.03.0002, 58 pages, Apr. 9, 2002.

SAP Annual Report—1998, SAP Ag. http://www.sap-ag.de/company/investor/ar_onlin/1998/init_e.asp, 1998.

* cited by examiner

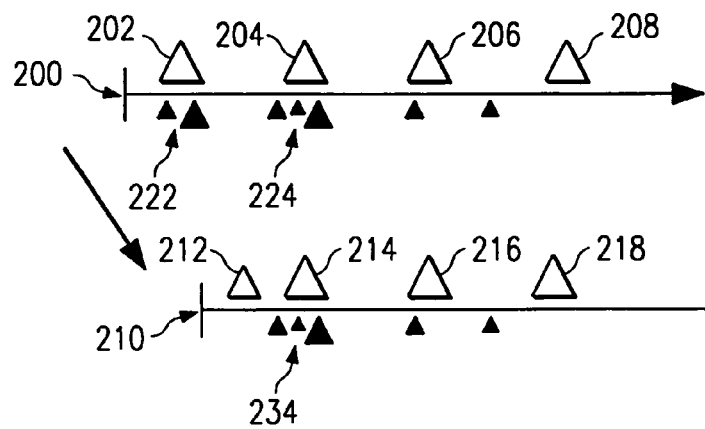
*FIG. 3*
*FIG. 4*
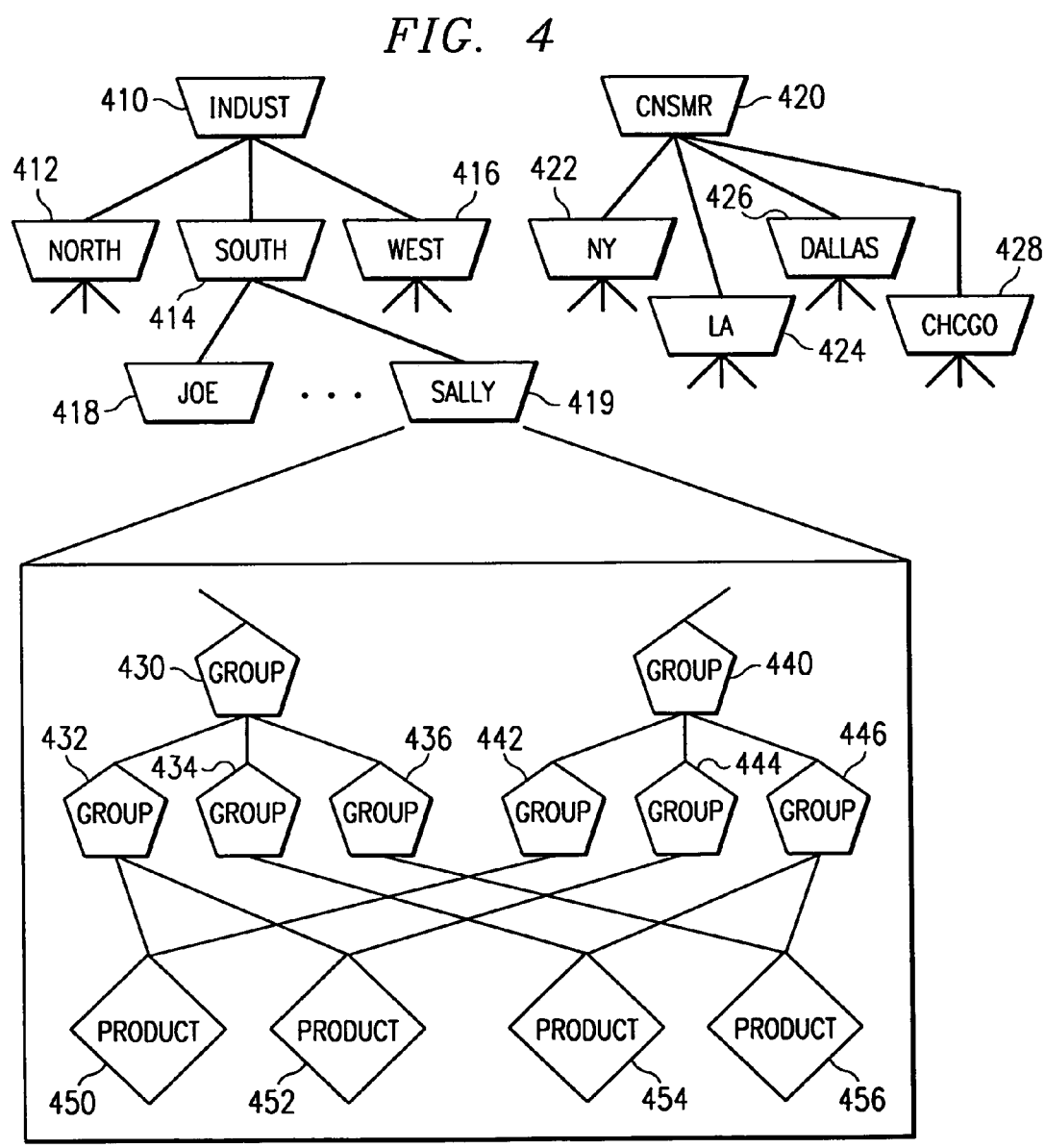

SYSTEM AND METHOD FOR ALLOCATING MANUFACTURED PRODUCTS TO SELLERS

CROSS REFERENCE TO RELATED APPLICATIONS

This application is a continuation of U.S. application Ser. No. 08/802,434, filed Feb. 18, 1997 now U.S. Pat. No. 6,167,380, by Brian M. Kennedy and Christopher D. Burchett and entitled "SYSTEM AND METHOD FOR ALLOCATING MANUFACTURED PRODUCTS TO SELLERS," which is a continuation-in-part of U.S. application Ser. No. 08/491,167, filed Jun. 16, 1995, by Brian M. Kennedy, and entitled SYSTEM AND METHOD FOR MANAGING ATP, pending.

This application also is related to the following applications which are incorporated by reference herein: U.S. application Ser. No. 08/491,153, filed Jun. 16, 1995, and entitled EXTENSIBLE MODEL NETWORK REPRESENTATION SYSTEM FOR PROCESS PLANNING; U.S. application Ser. No. 08/491,121, filed Jun. 16, 1995, and entitled INTERACTIVE REPORT GENERATION SYSTEM AND METHOD OF OPERATION; and U.S. application Ser. No. 08/491,168, filed Jun. 16, 1995, and entitled STRATEGY DRIVEN PLANNING SYSTEM AND METHOD OF OPERATION.

TECHNICAL FIELD OF THE INVENTION

This invention relates in general to the fields of demand management, supply chain management, capacity management, and configure-to-order processes. More particularly, the present invention relates to a system and method for managing available-to-promise (ATP) and making promises to fulfill customer requests.

BACKGROUND OF THE INVENTION

Manufacturers produce products for sale to customers. In the sales process, customers place demands on manufacturers. A customer demand may consist of a request for a particular quantity of a product by a specific date. This date and quantity information may be collectively referred to as the "customer request" or "request information".

Manufacturing and distribution facilities have limited resources (capacity) and limited inventories (materials). Therefore, every customer request may not be satisfiable in that some may receive no promise, others may receive an inadequate one. Planning and managing which customer requests to promise and fulfill, termed "demand management", is a fundamental and critical activity of most manufacturing and distribution organizations.

Due to material, capacity and other limitations, a manufacturer may not be able to meet a particular customer request. In this situation, the manufacturer typically negotiates with the customer to deliver a quantity of product by one or more dates agreeable to the customer. This date and quantity information may be referred to as the "manufacturer promise" or "promise information". Based on the manufacturer promise, the manufacturer creates operational plans to implement the promise information. Manufacturers may use a combination of diverse software tools in the negotiating and planning processes.

Traditional methods for demand management have several problems. First, such methods and systems are not integrated. Several different tools may be required to implement the entire demand management strategy. Second, such traditional systems and methods are not dynamic. Once a plan is in place, it is difficult for the manufacturer to react to changing circumstances and update the plan. Third, order promising to customers is often done based upon an infeasible plan. Later attempts to find a feasible plan that will satisfy the promises are often futile.

The environment today requires more and more responsiveness. Customers require significant product diversity and want promises to be made to their requests immediately, while on the phone. The traditional way of promising in configure-to-order or make-to-order environments involves submitting the request to the planners and then, a few days or weeks later, after the planners have gone through a planning cycle, receiving a promise or rejection.

Many manufacturing and distribution organizations have several sales offices associated with each manufacturing factory. Each sales office independently promises to supply products from the factory to customers. This is referred to as a "distributed organization". Each sales person in each of the sales organizations needs to be able to make instantaneous promises, simultaneously with other sales people doing the same. In addition, each of those promises need to be fulfillable by a feasible plan.

To better meet customer demand, the manufacturer must build product and/or intermediate items before receiving customer orders. This production is based on projections called "forecast orders". A product produced based on these forecast orders is referred to as "available to promise" or "ATP". ATP consists of quantities of products with associated dates that the products are scheduled to be available for delivery to the customer.

In distributed organizations a sales office may need approval from the factory before ATP may be promised to meet a customer request. This approval process may take up to a week under current practices. This delay is unacceptable in today's business environment.

SUMMARY OF THE INVENTION

In accordance with the present invention, a system and method for managing ATP are provided that substantially eliminate or reduce disadvantages and problems associated with previously developed systems and methods.

According to one aspect of the present invention, a software system is provided for managing available to promise (ATP) and making promises to fulfill customer requests. The software system includes a plurality of generic product models each representing a generic product. Each generic product model specifies one component of a plurality of possible components. A plurality of specific product models each represent a specific product and each specify all components of the specific product. Each component specified by each specific product model is specified by one of the generic product models such that each specific product model is related to a subset of the generic product models. A customer request matching a specific product then can be fulfilled by available-to-promise of the specific product or by available-to-promise of all related generic products.

According to another aspect of the present invention, a software system is provided that includes a plurality of seller models representing sellers that sell at least one product. The seller models are operable to forecast for the at least one product and operable to choose commitment levels creating forecast requests. The forecast requests receive promises made by supplier sites to provide product allocation to the organization, and the product allocation is available to the sellers to promise to actual customer requests. The plurality of seller models comprise a hierarchy that has an organization and one or more members such that product allocation to the organization can be used by the organization or promised to and used by the members. Also, the organization has a portion of the product allocation designated as first-come-first-served product that is available for consumption by the members as needed to promise to actual customer requests. In one embodiment, the organization further has a portion of the product allocation designated as retained product that is under the control of the organization and available for consumption by the organization or for promising to members.

According to a further aspect of the present invention, a software system is provided wherein the organization has an ATP horizon defined at a greater granularity than the forecast. The ATP horizon has ATP entries representing an amount of product from the product allocation that is available during each forecast period.

According to an additional aspect of the present invention, a software system wherein the organization promises product to the members based upon an automatic allocation policy. The automatic allocation policy can be first-come-first-served, per allocated, per committed, member rank, or fixed split. In one embodiment the automatic allocation policy also allows the organization to designate a forecast entry as a zero-ATP antry such that the available-to-promise product at the entry is always zero.

BRIEF DESCRIPTION OF THE DRAWINGS

A more complete understanding of the present invention and the advantages thereof may be obtained by reference to the following description, taken in conjunction with the accompanying drawings, in which like reference numbers indicate like features, and wherein:

FIG. 3 illustrates one embodiment of a time horizon with forecast requests and actual requests showing the time horizon moving as time passes and the forecast requests adjusting in response;

FIG. 4 illustrates one embodiment of a seller model hierarchy and a product group hierarchy within a seller;

DETAILED DESCRIPTION OF THE INVENTION

The Supply Chain, Site, and Seller Models

Figure 1:
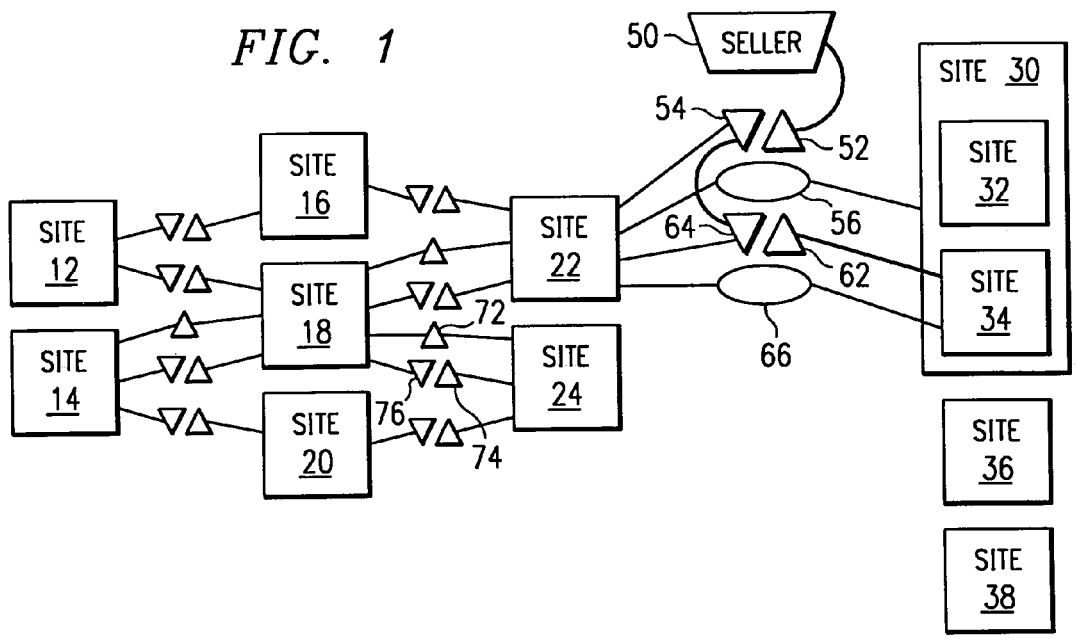
FIG. 1 is a block diagram of one embodiment of a supply chain model, including site models and seller models, and requests and promises between them.

FIG. 1 is a block diagram of one embodiment of a supply chain model, including site models and seller models, and requests and promises between them. FIG. 1 provides an example supply chain. The supply chain model of FIG. 1 comprises twelve site models, 12, 14, 16, 18, 20, 22, 24, 30, 32, 34, 36, and 38. These site models represent organizational units that may have the capacity and materials to produce or consume items. Each site can place requests for items upon other sites. Requests are in general indicated in FIG. 1 by triangles 52, 62, 72, and 74. For each request 52, 62, 72, and 74, the site 12, 14, 16, 18, 20, 22, 24, 30, 32, 34, 36, or 38 being requested can make a promise to fulfill (wholly or partially) that request. Promises are in general indicated by inverted triangles 54, 64, and 76.

Other primary members of a supply chain model are seller models. The embodiment of a supply chain of FIG. 1 consists of a single seller model 50. The seller model 50 is partially depicted in FIG. 2 and consists of a list of products 110 that seller 50 offers for sale. A product model 110 defines the supplier site, the item at that site, a minimum order lead time, a minimum quantity, and the allowed customer sites. If a customer request fits those criteria of a product, then that request is eligible to be filled by that product, at the pricing specified by that product.

A seller can model a sales person, group, channel, territory, or organization. It represents the responsibility for forecasting demand, committing to sales, managing allocations, taking orders, and promising orders.

Sellers may take requests from one site or multiple sites for items supplied by one site or several different sites. It manages the requests and promises made between those sites. A seller can act as an agent of the supplying site and make promises for those sites. Sellers can manage requests and promises for one product or many products. Products can be defined for certain customer(s), certain item(s), certain order lead time, certain price, and so on. Each product can be forecasted independently, or grouped with other products into product groups.

Sellers can form a hierarchy. Each seller can be a member of another seller, called its 'organization'. Allocations can be made to any level in the hierarchy. Sellers can use allocations to themselves or any of their organizations, depending upon allocation policies of the seller hierarchy. Sellers can have an associated rank used to prioritize the allocations. Sellers with higher rank can get their allocations before the allocation goes to lower rank sellers. For example, if an organization's allocated amount is less than what is needed by its members sellers, the allocation can be distributed among the sellers as specified by one of several allocation policies.

A product can define one or more items that are available to a set of customers with a certain delivery lead time to certain delivery territories, at a certain price. However, any of those product elements may, in fact, be unlimited (i.e., any delivery lead time, any delivery address, etc.). Each product is independently forecasted, allocated, and priced for the purposes of quoting/promising.

The primary purpose of forecasting and forecast management is to estimate the sales potentials for each of the products, independently. The primary purpose of master planning is to determine how capacity and materials will be allocated in order to best meet the forecasts for these products. Master planning determines how much of each product will be available and when. Order promising is then performed in terms of those allocations to these products. In this sense, the products define the granularity of the seller's master plan.

Products also define divisions for pricing, which is inherently tied to order promising. For example, if the customer is willing to pay more, the customer will often find more product available. Similarly, if the customer is willing to wait longer, the customer can often get a lower price.

It should also be noted that a customer may request a specific item on a specific date, and that request may be satisfied by any one of a number of products. Typically, each product will have independent availability and pricing. Consequently, a list of all the options for meeting the customer's request can be presented, and the customer can choose the most satisfactory among them, based upon quantity, timing and pricing.

From a supply point of view, the availability of a product is planned based upon building a representative configuration of an item and delivering it to a representative customer address. The less accurately these represent all the items and delivery addressees included, the less accurate the availability information will be. Therefore, promises can be padded with extra lead time to compensate for possible misrepresentation. In many cases, products can be defined at a low enough level that availability is accurately planned and no safety padding is necessary.

Figure 2:
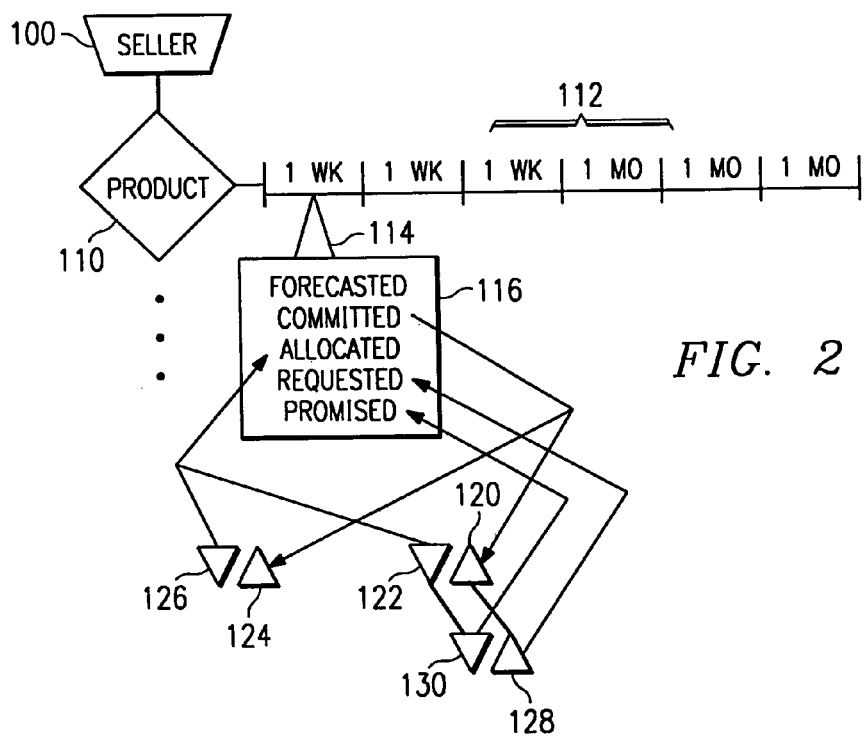
FIG. 2 illustrates one embodiment of a forecast entry for one of several forecast periods for one of several products within a seller.

FIG. 2 illustrates one embodiment of a forecast entry for one of several forecast periods for one of several products within a seller. For each product 110, a forecast horizon 112 is laid out. Forecast horizon 112 can be broken up arbitrarily. In this embodiment, three 1-week periods (the first being 114) are followed by three 1-month periods. For each forecast period for each product, a forecast-entry 116 is generated. The 'forecasted', and 'committed' values can be filled in. The value 'forecasted' is the seller's estimate for how much could be sold of that product 110 during that period. The value 'committed' is the quantity the seller is willing to commit to selling.

The committed quantity results in 'forecast' requests being generated in an amount equal to the committed quantity, spread out through the corresponding forecast period according to a forecast policy specified by the product 110. In the embodiment of FIG. 2, the committed amount results in generation of requests 120 and 124, spaced out in the period 114. The site on which the requests 120 and 124 were placed (specified by the product 110) can then issue promises. Assuming promises 122 and 126 are made for requests 120 and 124, respectively, the value of 'allocated' in the forecast entry 116 for period 114 will be the sum total of the promised quantities.

The allocated amount is the summary amount the seller has available to promise customer requests. When customer request 128 arrives to the seller for product 110 during period 114, the seller can take one or both (or part of one or both) promises that it has already received, break them up or combine them to form a promise for the customer request. The forecast requests are simultaneously adjusted down by the amount of the customer request. So, for example, if the committed value of forecast entry 116 was 500 units, the two forecast requests 120 and 124 were for 250 units each, the two promises 122 and 126 were received for 200 units, and the customer request 128 was for 300 units, then the two forecast requests 120 and 124 will be adjusted to a total of 200 (i.e., 200 and 0 or 100 and 100 or some other combination, dependent upon the product's forecast policy). The two promises 122 and 126 will be adjusted to a total of 100, and a new promise 130 will be created for 300 units to satisfy request 128. The 'committed' and 'allocated' values of forecast entry 116 do not change as a result, but the 'requested' and 'promised' values do. When 'promised' is equal to 'allocated', then there are no more promises available for promising customer requests.

This process is also depicted in the supply chain model example of FIG. 1. In FIG. 1, seller 50 generates forecast request 52 on site 22 for delivery to site 30 (which need not be a physical site). Request 52 results in site 22 generating operation 56 to perform the activity involved in delivering the requested items to site 30. If operation 56 is feasible to perform, then site 22 may choose to create promise 54 to seller 50 that the item can be delivered as requested by request 52.

Site 34 then places request 62 through seller 50 for the same product as request 52. If that customer request 62 is consistent with what seller 50 was forecasting, then seller 50 can reduce request 52, promise 54, and operation 56 by the amount of request 62, and then add promise 64 and operation 66 to fulfill request 62. That simple action did not require replanning through site 22. Effectively, the ability of site 22 to satisfy request 62 had been pre-computed in the form of promise 54. Thus, that promise 54 can be split in order to form promise 64.

A primary caveat is that the load and times of the operation 56 may not be valid when split into operation 66. For example, if operation 56 involved using a truck to transport the items, then splitting out operation 66 may result in an additional truck being used. If none was available, then operation 66 may have to wait. To compensate for this, each product defines criteria for splitting promises, which can include an amount of time with which to pad the due dates quoted.

Of the site models that make up a supply chain model (as in FIG. 1), some of the sites can be under the control of that supply chain model, while others can be modeling sites which are planned independently. A field of the site model called 'managed' indicates which sites are managed by this supply chain model and which are not. Two sites that are both managed do not need to make formal promises between each other—the request will generate an operation and all changes to the requests are immediately passed through the operation to the other site. Requests between a managed site and an unmanaged site require formal promises. The promises must be made explicitly, and once accepted constitute a rigid agreement between two sites. Changing that agreement requires both sites' consensus.

Adjustment as Time Passes

Forecasts are often, by their nature, wrong. Thus, as time passes and customer requests arrive faster or slower than expected, it is desirable to modify the forecasts as appropriate. Given a large number of products and numerous forecast periods, automated adjustment is highly desirable. Thus, the product forecast policy can specify how the forecasted and committed quantities should be adjusted as time passes and actual Requests are received or not.

FIG. 3 illustrates one embodiment of a time horizon with forecast requests and actual requests showing the time horizon moving as time passes and the forecast requests adjusting in response. The timeline 200 represents the initial state. Forecast requests 202, 204, 206, and 208 have been made in their respective forecast periods. Customer requests are indicated with triangles, as shown. The two customer requests 222 correspond to forecast request 202. The three customer requests 224 correspond to forecast request 204.

Time passes and no more requests are received. The timeline 210 represents that later state. Time has advanced beyond the forecast period of the forecast request 202. The customer requests 222 received during that period were less than that forecast request. One option is to assume the forecast was too high and simply expire the leftover forecast.

Another option is to assume the forecast quantity is right, but that the timing is off—that the total quantity will be requested soon. In the latter case, the forecast request should be moved forward in time and reduced in quantity. This is shown as forecast request 212. There are many other options for how to expire, reduce, or increase forecast requests based on the arrival rate of customer requests that can be encoded in the product's forecast policy.

Allocation to Sellers

FIG. 4 illustrates one embodiment of a seller model hierarchy and a product group hierarchy within a seller. FIG. 4 shows two Seller hierarchies. Seller 410 represents an Industrial Products marketing division, and seller 420 represents a Consumer Products marketing division. Within Industrial Products 410, there are three sales offices that each handle a region: the North is handled by seller 412; the South is handled by seller 414; the West is handled by seller 416. Each sales office is made up of numerous sales people, who are each represented by a seller (for example, Joe is seller 418 and Sally is seller 419). Seller 410 is an organization having three members: sellers 412, 414 and 416. In turn, seller 414 has members: seller 418 and 419. Similarly, seller 420 is an organization having four members: sellers 422, 424, 426 and 428.

In many organizations, the sellers may own their own allocations against which they can promise to their customers without consulting the company. However, sellers need not own any allocations. For example, Joe 418 and Sally 419, along with the other sellers in the South sales office 414, may each forecast what they intend to sell. Those forecasts are aggregated up to the sales office seller 414, where they are used as an input. The seller 414 can independently forecast for the whole sales office. That, in turn, is aggregated up to the Industrial Products 410 division.

The forecast demand at the top seller 410 is then placed as requests for the site. The site will plan to satisfy the request and promise to it. That promise becomes the allocation to the top seller 410, which in turn results in allocations to the South Seller 414. Those allocations can be used by any of the sub-sellers, such as Joe 418 and Sally 419. However, such collective usage of the allocations requires coordination. They must reserve the amount they need before they can actually promise it, since the other sales people may be considering using the same allocations.

A seller is committed to anything its sub-sellers commit to. However, a seller can commit to additional, beyond what the sub-sellers commit to. For instance, each sales person may make a conservative commitment. The sales office will know that some of the sales people will surely sell over their commitment, but it is not clear which sales people. So the sales office can commit to sell additional, and those additional allocations will be available to the first sales people who exceed their personal allocation.

Allocation Policies

An organization can have an allocation policy for each product for promising its allocation to its members. One allocation policy is a first-come-first-served (FCFS) allocation policy. The FCFS allocation policy essentially does no allocation. Rather it makes the organization's whole allocation available for the members to consume on a first-come-first-served basis as customer requests are received.

Another allocation policy is a per allocated policy. The per allocated allocation policy distributes initial allocations proportional to the quantity 'committed' to by each seller member. Thereafter, allocations are adjusted proportionally to the quantity 'allocated' to each seller member. A portion of the allocation can be retained for use at the discretion of the organization. Any leftovers due to lot sizing or explicit adjustments would be made available on a first-come-first-served basis. Retained product under a per allocated policy is the percentage of the allocated quantity that should remain at the organization. In other words, no member would get access to it unless the seller explicitly reduced the retained quantity. FCFS product under a per allocated policy is the minimum percentage of the allocated quantity that should not be allocated to the members, but rather made available for fist-come-first-served (FCFS) use by the organization or its.

A per committed allocation policy distributes the allocations proportional the quantity committed to by each member seller. A portion of the allocation can be retained for use at the discretion of the organization, and any leftovers due to lot sizing or explicit adjustments can be made available on a first-come-first-served (FCFS) basis, as discussed above.

A further allocation policy is a member rank policy. The member rank allocation policy distributes the allocations to the members in the order of their rank. For members with equal rank, this policy distributes to each proportional to the quantity 'committed' to by that member. A portion of the allocation also can be retained for use at the discretion of the organization, and any leftovers due to lot sizing or explicit adjustments can be available on a first-come-first-served (FCFS) basis.

A fixed split allocation policy distributes according a fixed percentage breakdown among the members the product's owner. This breakdown is defined in the 'allocations' submodel of the product model. All members of the product's owner which are not assigned a fixed percentage split in the 'allocations' list are assumed to be allocated zero. Again, a portion of the allocation can be retained for use at the discretion of the organization, and any leftovers due to lot sizing or explicit adjustment will be available on a first-come-first-served (FCFS) basis. If the sum of the fixed percentage splits defined in the allocations is not equal to 100%, then the 'splits' can be normalized to 100%. The original amount is reduced by the retained percent, and the result is allocated using the normalized splits.

It should be understood that numerous other allocation policies could be implemented as facilitated by the model extension mechanism described in U.S. application Ser. No. 08/491,153, filed Jun. 16, 1995, and entitled EXTENSIBLE MODEL NETWORK REPRESENTATION SYSTEM FOR PROCESS PLANNING.

Product Groups

Forecasts tend to be more accurate in aggregate. A monthly forecast will generally be more accurate than a weekly forecast. A forecast for North America will generally be more accurate than a forecast for Texas. Similarly, a forecast for milk will generally be more accurate than for skim milk in pint containers.

Thus, it is important to be able to aggregate up forecasts, modify the aggregated forecasts, and propagate the changes back down to the individual products. The product group model supports this functionality. Product groups form hierarchies. A product group can have at most one parent product group, and thus can be in at most one product group hierarchy.

Products, on the other hand, can appear in numerous product groups; however, only in one product group of any one hierarchy. A product group defines one consistent hierarchy for aggregation. However, sellers will need to aggregate the products in many different ways. For example, milk products can be aggregated by their container size (gallon, half gallon, quart, pint), by their fat content (whole, 2%, 1%, skim), by the customer grouping (grocery-store, restaurant, convenience-store), or by brand (ECONO-COW, PURE-WHITE).

Product groups are depicted in FIG. 4. Products 450, 452, 454, and 456 are grouped into two product group hierarchies, rooted at product groups 430 and 440. Product group 430 is broken down into product groups 432, 434, and 436.

Advanced Available-To-Promise (ATP)

Each seller has allocation (promises) available for the various products sold. When a customer request comes in to a seller, there may be numerous products that match the request. If the lowest cost product can fully satisfy the request (has sufficient quantity by the requested due date), then the request can simply be promised. Otherwise, a decision may be needed. For example, the customer may be able to choose to have it for a low price but a week later than requested, or by the date requested but 10% higher price. It may be that half the order can be completed on time at the lowest price, but the other half can either be delivered later or for a higher price, and so on. Thus, the ATP can be a list of different products (pricings) with different order lead times, minimum quantities, availability dates, and availability quantities.

To facilitate batch promising, the request model can support a field called a promising policy which specifies what the requests would like. A number of promising policies are possible of which the following are examples. One policy is an "on-time" promising policy which indicates that, if the request can not be satisfied, then a promise should only be made for the amount/price that can be delivered on the date requested (it will be promised short). This request should not be promised late. Another policy is an "all" promising policy which indicates that, if the request can not be satisfied, then a promise should only be made for the entire amount/price (it will be promised late). This request should not be promised short. An "all on time" promising policy indicates that, if the request can not be satisfied for the entire amount/price on the date requested, then it should not be promised. This request should not be promised short or late. A further policy is an "asap" promising policy which indicates that, if the request can not be satisfied, then it should be promised so as to deliver as much of the request as possible as soon as possible. This may split the request into a number of deliveries. Another example policy is an "asap monthly" promising policy which indicates that, if the request can not be satisfied, then it should be promised so as to deliver as much of the request as possible on the date requested and the rest will be split into monthly deliverables. The monthly deliveries will be as late in the month as required to obtain the maximum amount of the available to promise for that month, but no later.

Extensible Product Model

The product model type has a forecast policy extension selector that allows additional fields and semantics to be added to a product model. Extension selectors are described in more detail in U.S. application Ser. No. 08/491,153, filed Jun. 16, 1995, and entitled EXTENSIBLE MODEL NETWORK REPRESENTATION SYSTEM FOR PROCESS PLANNING, the disclosure of which has been incorporated herein by reference.

In this way, additional forecast information such as forecast error or forecasted variance in either quantity or time or both can be input and used. Additional fields for expected skew during the month can affect how the committed quantity is split out into forecast requests. The expected variance or order arrival rates can affect how forecast requests expire or adjust as time passes, based on the customer requests that have been received.

Retained and FCFS Product

Figure 5:
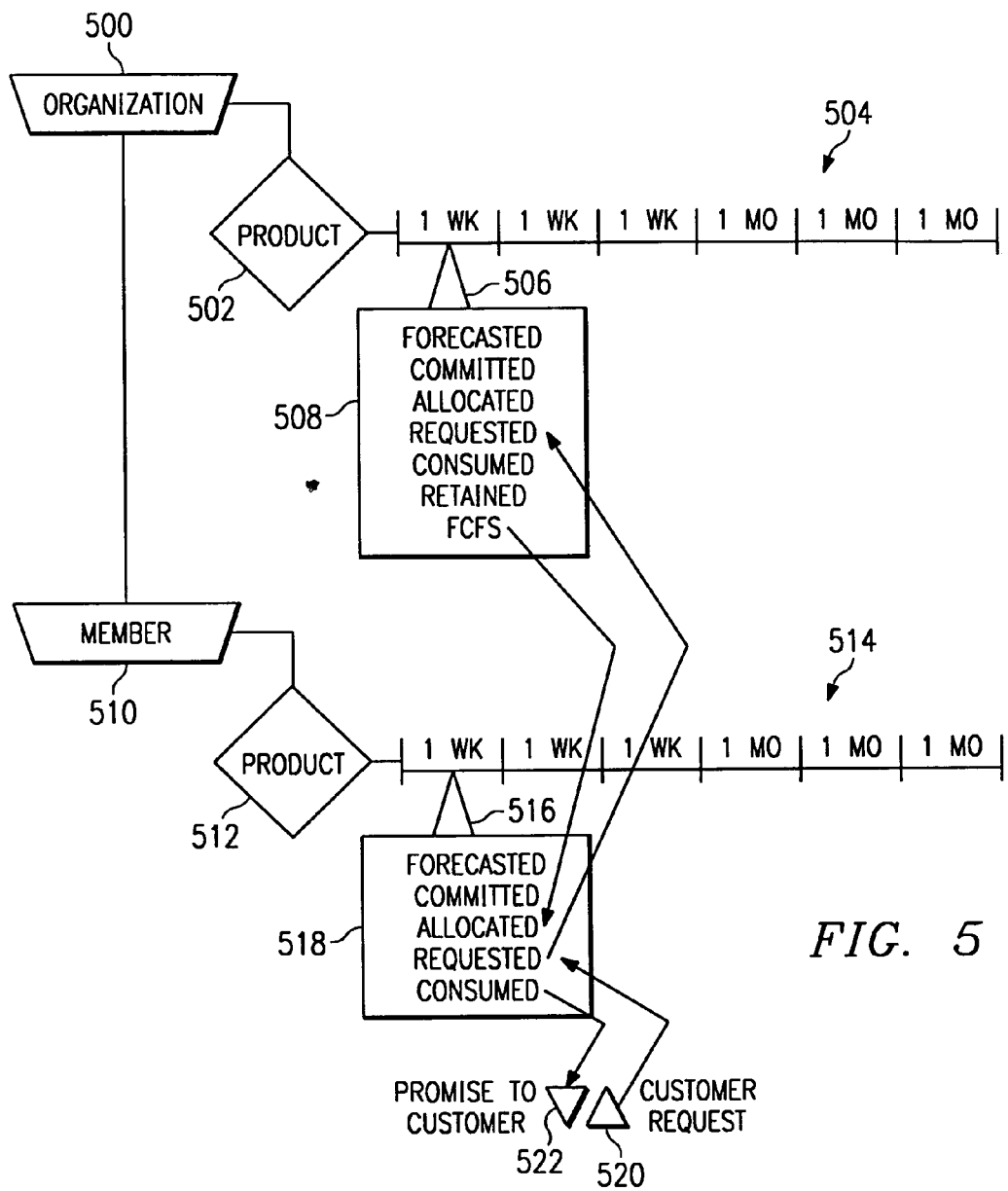
FIG. 5 illustrates one embodiment of retained and first-come-first-served product within a seller organization for a forecast period.

FIG. 5 illustrates one embodiment of retained and first come first served product within a seller organization for a forecast period. As shown in FIG. 5, a seller organization 500, for each product 502, has laid out a forecast horizon 504. Forecast horizon 504 can be broken up arbitrarily. In the illustrated embodiment, three one-week periods, the first being 506, are followed three one-month periods. For each forecast period for each product, a forecast entry 508 is generated.

Forecast entry 508 contains a number of values. The 'forecasted' and 'committed' values can be filled in by organization 500. The value forecasted is the estimate for how much of product 502 could be sold during forecast period 506 by organization 500, including its own sales and that of member 510 or other members. The committed value is the quantity that the organization 500 is willing to commit to selling. The 'allocated' value is the quantity of product that has been promised to organization 500 by sites to which organization 500 placed requests. The 'requested' value is the quantity of product 502 that has been requested by member 510, other members, and direct customers of organization 500. The 'consumed' value is the quantity of product that has been promised either to member 510, other members, or customers of organization 500. The 'retained' value is the quantity of the product 502 that has been designated by organization 500 to remain under its control and not promise to member 510 or other members. As mentioned above, the retained value can be expressed as a percentage. The 'FCFS' value is the quantity of product that organization 500 has allocated for the use of member 510 and other members on a first-come-first-served basis.

Member 510 is a seller underneath organization 500. For each product 512, a forecast horizon 514 is laid out by member 510. Forecast horizon 514 can be broken up arbitrarily as discussed above. In the illustrated example, product 512 corresponds to product 502 of organization 500. For each forecast period 516, a forecast entry 518 is generated.

Forecast entry 518 includes a number of values analogous to those discussed above. The 'forecasted' value is the estimate for how much of product 512 could be sold during forecast period 516 by member 510. The 'committed' value is the quantity that member 510 is willing to commit to selling. The 'allocated' value is the quantity of product that has been promised to member 510 by organization 500. The 'requested' value is the quantity of product 512 that has been requested by member 510 from organization 500. The 'consumed' value is the quantity of product that has been promised to customers of members 510.

As an example of the use of the retained and FCFS product at organization 500, FIG. 5 shows a customer request 520 being received by member 510. Assuming, for the example, that member 510 is in a state where it has consumed all of its allocated product, member 510 must generate a request to organization 500 for additional product to fill customer request 520. Thus, the requested value in forecast entry 518 is increased to reflect the number of product requested from organization 500. According to the present invention, if there is FCFS product available at organization 500, member 510 can use that FCFS product to fill the customer request 520. In this situation, organization promises a quantity of the FCFS product to member 510.

The FCFS value in organization 500 is thereby decreased and the consumed value is increased. At member 510, the allocated value is increased by the number of FCFS product promised by organization 500. Member 510 can then issue a promise 522 to the customer for the requested product. The consumed value in forecast entry 518 is then increased to reflect the newly promised product.

A technical advantage of the present invention is that the retained value in the forecast entry of the organization allows the organization to remain in control of some product either for its own selling purposes or to later allocate to FCFS product or directly to one of its members. Another technical advantage of the present invention is that the FCFS value set by the organization allows the organization to create buffer product that can be used across all of its members to smooth allocations of too little or too much product to various members.

ATP Horizon

Figure 6:
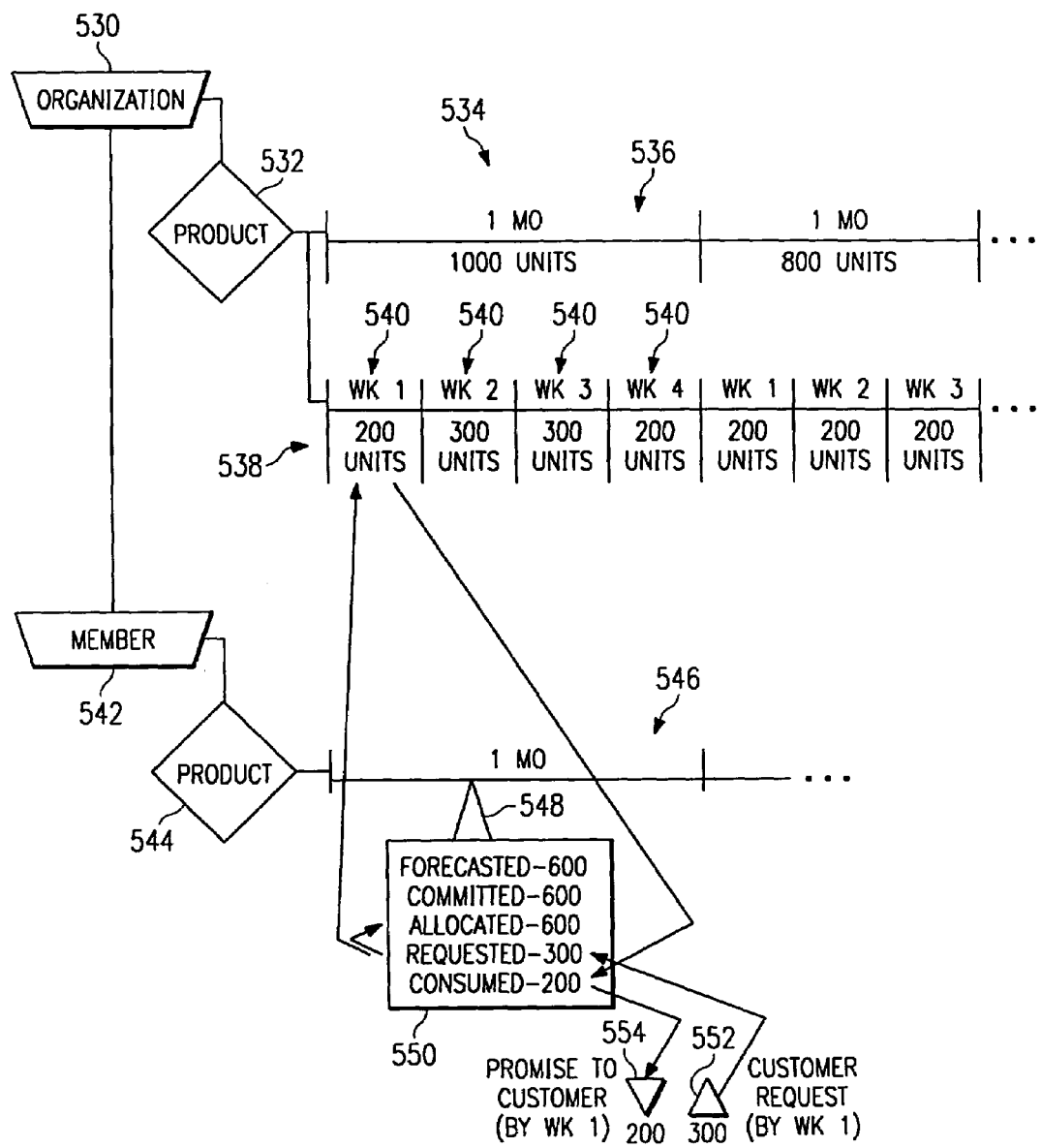
FIG. 6 illustrates one embodiment of ATP entries associated with a forecast entry for a product within a seller organization.

FIG. 6 illustrates one embodiment of ATP entries associated with a forecast entry for a product within a seller organization. FIG. 6 is similar to FIG. 5 in that it shows an organization and a member having forecast entries for products. An organization 530 has, for each product 532, a forecast horizon 534 that includes a forecast entry 536 for each forecast period. Organization 530 also includes an ATP horizon 538 that includes ATP entries 540 for each ATP period within ATP horizon 538. As can be seen, the ATP periods are at a finer granularity than the forecast periods in forecast horizon 534.

As an example, organization 530 has forecasted 1,000 units being sold in the first month in forecast horizon 534. As shown in ATP horizon 538, organization 530 has allocations for product that is available to promise during this first month: 200 units available in week one, 300 units in week two, 300 units in week three, and 200 units in week four. From ATP horizon 538, organization 530 indicates that, although the total number of forecasted units in the first month is 1,000 units, those 1000 units are not all available in week one but are distributed throughout the month.

Member 542 of organization 530 also has for each product 544 a forecast horizon 546. Forecast horizon 546 has for each forecast period 548 a forecast entry 550. The forecasted, committed, allocated, requested and consumed values in forecast entry 550 are the same as those described and, for example, are set to the shown numbers. Assuming, that a customer request 552 is received for 300 units by week one, member 542 uses ATP horizon 538 to determine what portion of its allocated product is actually available in week one.

The customer request 552 is reflected by changing the requested value in forecast entry 550 to 300. In order to fill that request, member 542 first checks whether it has been allocated sufficient units within the forecast period to fill the order. As shown, member 542 has been allocated 600 units within the month. Assuming that prior to filling the customer request 552 member 542 has not promised any product to other customers, member 542 has the full 600 allocated units available to promise. However, member 542 also checks whether there are sufficient units from organization 530 available to promise specifically in week one by checking ATP horizon 538 of organization 530. As shown, organization 530 only has 200 units available to promise in week one. Consequently, member 542 can only generate a promise 554 to the customer promising 200 units by week one. Promise 554 is then reflected by increasing the consumed value in forecast entry 550 to 200.

A technical advantage of the present invention is that the ATP horizon designated in the organization prevents members from promising product out of their available to promise products that appear to be available within the forecast period but are not available as early as they might promise it. The finer granularity provided by the ATP horizon allows members to have greater knowledge about when product can be promised within a forecast period, but without forcing allocations to be made at that finer granularity (which reduces overall flexibility and more ATP management effort).

Zero-ATP Designation

Figure 7:
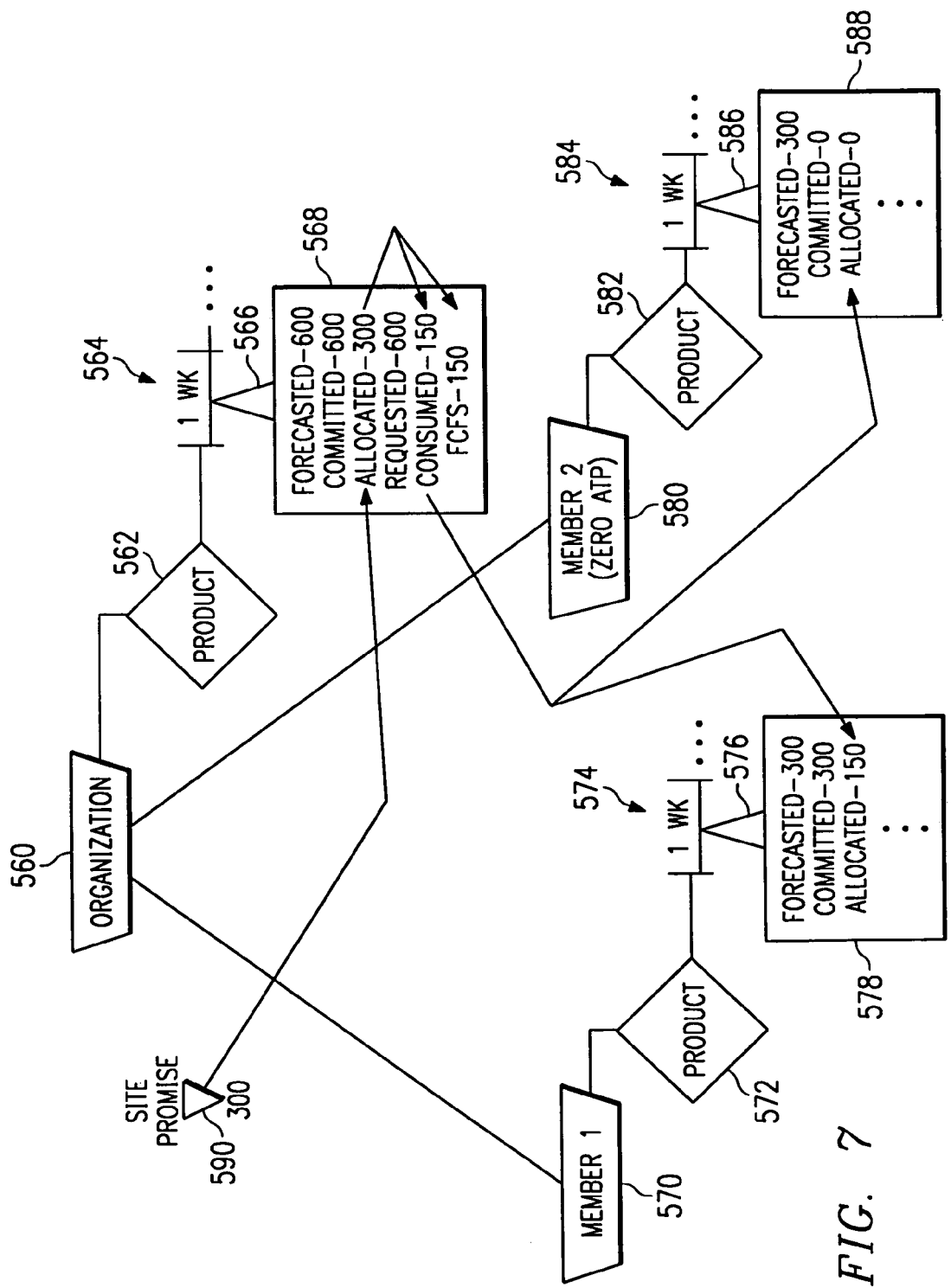
FIG. 7 illustrates one embodiment of a zero-ATP designation for a forecast entry of a member of a seller organization.

FIG. 7 illustrates one embodiment of a zero-ATP designation for a forecast entry of a member of a seller organization. As shown, an organization 560 has for each product 562 a forecast horizon 564. In each forecast period 566, the organization has a forecast entry 568. In the illustrated example, the forecasted, committed, allocated, requested, consumed and FCFS values are set as shown. Member 570 has for each product 572 a forecast horizon 574. In forecast horizon 574, each forecast period 576 has an associated forecast entry 578. A second member 580 also has for each product 582 a forecast horizon 584 with each forecast period 586 having a forecast entry 588. In the illustrated example, forecast entry 588 of member 580 has been designated a zero-ATP forecast entry. The forecast entry 578 and forecast entry 588 reflect that both member 570 and member 580 have forecasted a sale of 300 units. The difference between the two is that forecast entry 588 is designated zero-ATP and therefore receives no allocation from organization 560.

When organization 560 receives a promise 590 allocating units based upon its forecast, that promise 590 may or may not match the forecasted number. In the illustrated example, promise 590 is only for 300 units while organization 560 forecasted 600 units. The result is that organization 560 only has 300 units to allocate to member 570 and member 580. Organization 560 can allocate, for example, based upon an allocation policy proportional to committed. Thus, organization 560 allocates 150 units to each member 570 and member 580. However, because forecast entry 588 is a zero-ATP entry, the allocation is different. The 150 units allocated to member 570 are actually directly promised to member 570 and result in 150 units being consumed at organization 560 and 150 units being allocated to member 570. On the other hand, the allocation to member 2 is actually made by organization 560 as FCFS quantity. Thus, the FCFS value holds 150 units, and member 580 has no units allocated to it. If member 580 makes a promise to a customer, member 580 must obtain allocations for those units from the FCFS product of organization 560 as sales are made. Of course, if member 570 uses up its allocation of 150 units, member 570 can also use the units from the FCFS product at organization 560.

In this manner, the zero-ATP designation of forecast entry 588 of member 580 allows organization 560 to adjust its allocation policy such that forecast entry 588 always has a zero-ATP. This forces any unconsumed allocated units back up to organization 560 which can be placed into FCFS product or dealt with as desired.

Generic Products and ATP

Figure 8A:
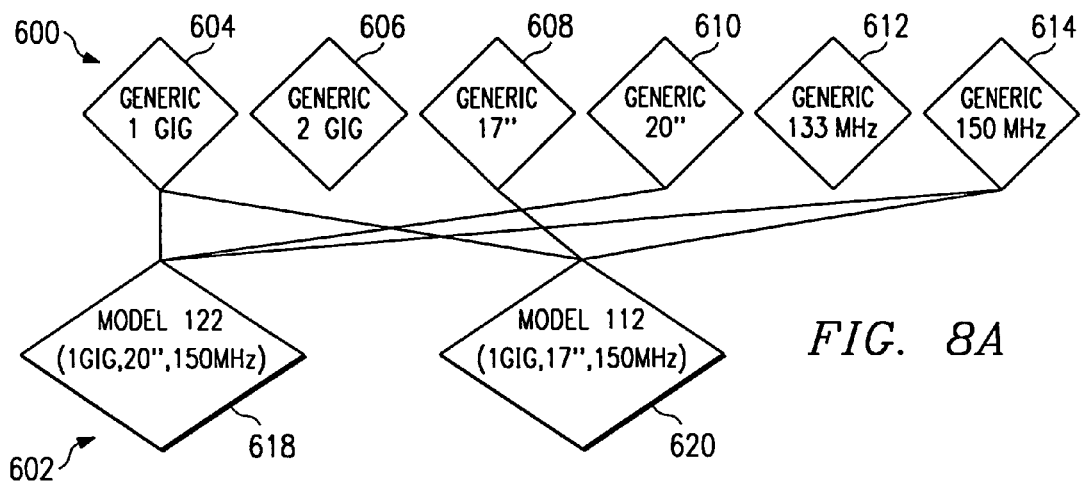
FIGS. 8A and 8B illustrate one embodiment of generic products and ATP associated with generic products.
Figure 8B:
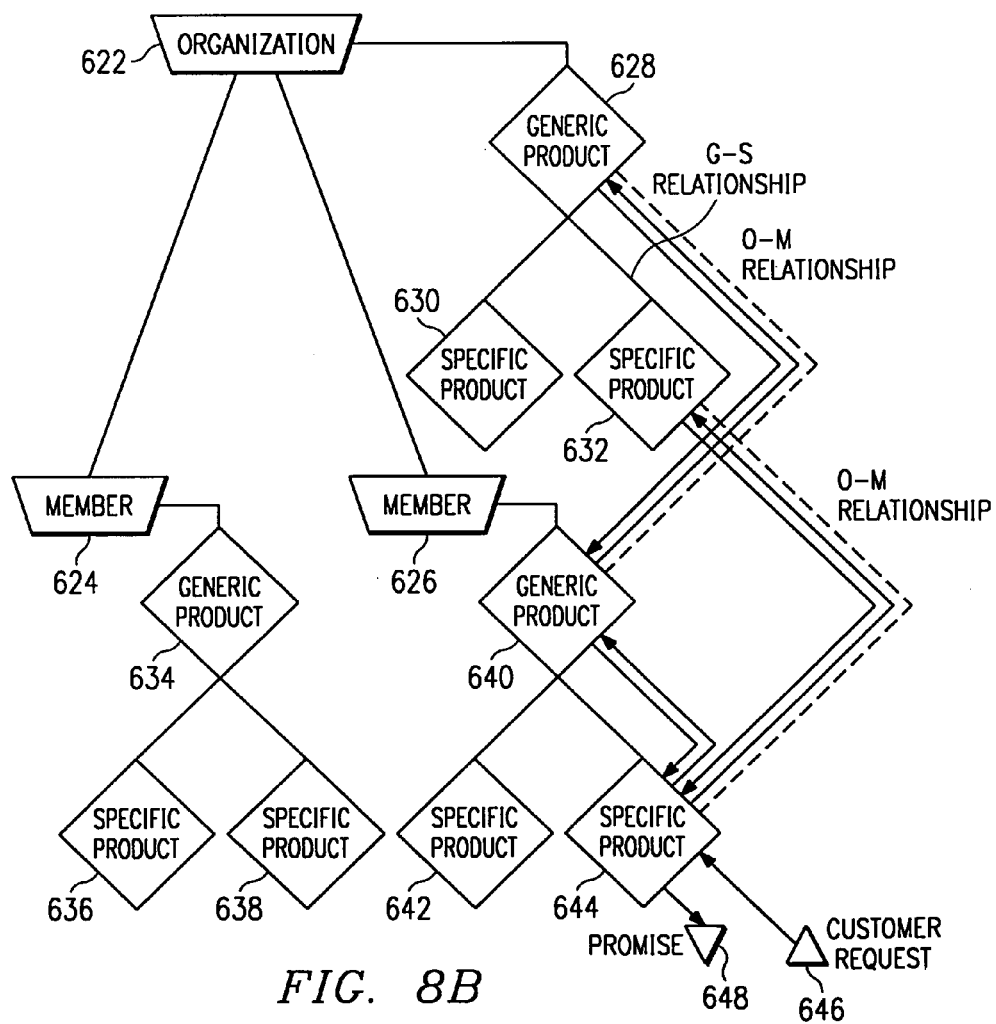

FIGS. 8A and 8B illustrate one embodiment of generic products and ATP associated with generic products. As shown, a plurality of generic products, indicated generally at 600, and a plurality of specific products, indicated generally at 602, have been defined. In the example of FIG. 8A, generic products 600 and specific products 602 refer to building of personal computers. Specifically, for this example, a generic product 604 has been defined that is a generic PC with a 1-gig hard drive. A generic product 606 has been defined that is a generic PC with a 2-gig hard drive. Generic product 608 is a generic PC with a 17-inch monitor, and generic product 610 is a generic PC with a 20-inch monitor. Further, generic product 612 is a generic PC with a 133 MHz processor and generic product 614 is a generic PC with a 150 MHz processor. These generic products are defined such that one component is required in each generic product but the remaining components are not specified.

Specific products 602 are associated with generic products 600. For example, a specific product 618 is model 122 and comprises a 1-gig hard drive, a 17-inch monitor and a 150 MHz processor. Specific product 618 falls under generic 604, generic 608 and generic 614. Similarly, a specific product 620 is model 112 and comprises a 1-gig hard drive, a 17-inch monitor and a 150 MHz processor. Using generic products 600, it is possible for an organization to plan for sales based on the number of certain components that are sold without having to plan based on specific products 602. This is useful because, in many industries, it is very difficult to forecast specific products accurately, but relatively easy to forecast the generic families.

FIG. 8B then shows how generic products can be used within the seller hierarchy. As shown, an organization 622 has a member 624 and a member 626. Organization 622 has a generic product 628 defined which is associated with a specific product 630 and a specific product 632. Similarly, member 624 has a generic product 634 and specific products 636 and 638. Member 626 also has a generic product 640 and specific products 642 and 644. It should also be understood that the generic and specific products defined for organization 622 and members 624 and 626 refer to the same generic and specific products. Although not shown, organization 622, member 624 and member 626 have forecast horizons and forecast entries for the generic and specific products. This hierarchy includes generic-specific (G-S) relationships and organization-member (O-M) relationships. It should be understood that the G-S relationships and O-M relationships within the hierarchy can be any depth and are shown as having a depth of two for purposes of explanation.

Assuming that member 626 receives a customer request 646 for specific product 644, the resulting search for available-to-promise product through member 626 and organization 622 can be as follows. Initially, member can check whether it has sufficient available-to-promise of specific product 644 to support a promise 648 to the customer. If not, member 626 can then check whether it has sufficient available-to-promise generic product 640. If there is not sufficient available-to-promise product within member 626, member 626 can check with organization 622 to see whether there is FCFS product of generic product 628 or specific product 632 at organization 622. Thus, member 626 can use any of these sources to obtain sufficient allocation to make promise 648.

Thus, the generic products are products that represent more generic demand, demand for a class of products, or demand for products built with a certain component. It is often very difficult to forecast for specific products, whereas it is much simpler and accurate to forecast for more generic products. Given this, it is preferable to setup allocations and ATP for those generic products and allow all the different specific products to consume ATP as needed from those generic products. The generic products and ATP prevents any need to prematurely allocate to specific products, but still allows the hierarchy to forecast and allocate some level of certain specific products. This is often used to implement a more sophisticated form of two-level (or N-level) master planning. Thus, when you look at the ATP for the generic product, it will have solid plans backing it up. The material and capacity is all reserved (and well planned) to meet that ATP. Also, when there is a forecast for the generic product, the forecasts for the specific products are deducted, and it is planned to build the remainder.

Forecasted and committed for a generic product are estimates of the total demand for the generic product and all of the specific products below it. As such, these values should be equal to or greater than the sum of the corresponding values in the specific products of that generic product. The same is true of any product with respect to the sum of the corresponding products in the seller's members.

Allocated of a forecast entry is at least the sum of all promises from the site to the forecasted requests generated by the forecast entry and to any actual requests that are consuming from that forecast entry or any of the corresponding forecast entries in the specific products or member products below it. It should be noted that care should be taken not to double-count the entries that are specific products of the generic product in a member seller. Also, it should be noted that if a forecast entry has an organization then its allocated can be higher than the previous sum as the organization can give some of its allocation to its members. However, the allocation should not be less than the previous sum. In addition, the forecast requests generated by a forecast entry should be reduced by the actual requests or promises that are planned onto the site. This can be referred to as "forecast consumption."

It should be noted that "forecast consumption" is a standard industry practice and is not detailed herein. The purpose of forecast consumption is to not double-plan the demand. In other words, if one plans for both the forecasted demand and the actual demand (which is predicted by the forecast), then one is planning for the same demand twice. To plan properly, one should plan for the actuals plus plan for forecast requests that equal the committed forecast quantity minus the actuals (if less than zero, then plan no forecast requests, just the actuals).

One thing to note about forecast consumption in this context is that the actuals that appear at members may consume from forecast at the organization. Similarly, the actuals at a specific may consume from forecast at the generic products. So, as planned actual promises change, causing the consumed value in a seller member's forecast entry to change, the requests and promises generated by the organization's forecast entry will be reduced (i.e., the forecast at the organization is consumed by actuals at any of the members). The same can also be true in the generic products—if there were not enough forecast requests at the specific product to be consumed, then the remainder will be consumed from the generic products' forecast.

There are numerous options for how to implement the fields of the forecast entry. In particular, one key decision is which fields to compute on-demand and which fields to maintain up-to-date. The preferable choice is highly situation-dependent and access-dependent. However, it is believed that maintaining the values up-to-date will typically be the preferable choice since typically one accesses the values much more often than one adjusts them.

With respect to maintaining the forecast entry values, as with any set of interrelated values that must be maintained, one must identify each function that can modify a value in a forecast entry and write functionality to adjust the related values in that forecast entry and in related forecast entries. For example, when a planned actual promise from a site to the customer is increased, several values should be changed. First, the consumed value should change in the related forecast entry (i.e., the forecast entry it was originally quoted from, or perhaps later reassigned to). Further, the consumed value should go up by the same amount in the corresponding forecast entry of each of the generic products, if any. If the seller has an organization, then the corresponding forecast entries in each of those products should be adjusted in the organization as well, and in each of its organizations.

It should be noted that the propagation up the two trees—the generic products and the organizations—should be designed such that one does not hit any entries twice. For example, one can go up the generic tree and for each generic tree go up the organization tree. However, as one goes up the organization tree, one should not go up the generics tree of each, or some nodes will be adjusted twice.

Adjusting the consumed value is relatively straight forward. The allocated value should also be adjusted when a planned actual promise is increased. It can be slightly more complicated due to the fact that the allocations at organizations can be allocated down to the members. Thus, when a planned actual promise increases, it may actually result in no change to the allocation values. Related to all this is the consumption of forecast requests generated at the top of the hierarchy. Recall that the allocated value in a forecast entry is at least the sum of the promises to the planned forecast requests generated by the forecast entries plus the sum of the planned actual promises at that forecast entry and all below it in either tree—in its specific products and in its members. The value could be more if it has an organization that has allocation that it has passed down to its members. Of course, the top-most organization cannot have allocation passed down to it, thus it is always equal to the stated sum.

So, when a planned actual promise increases, if that is still within the committed forecast sum at the top of the tree, then the generated forecast requests will be decreased by the same amount that the actual promise increases. Since those are both summed together, the net effect on the sum at the top-most organization will not change—its allocation does not change. However, the allocations lower in the tree may change. The allocations may have moved from organization to member; or from generic to specific.

One way to implement this scheme that is somewhat less complicated is to keep an additional internal field, 'min_allocated'. This field is maintained as simply the sum discussed above where the allocated must be "at least" this value. That sum can be maintained as simply as the consumed sum discussed earlier. With that, then it is easy to maintain allocated properly. As adjustments are made to min_allocated, if it ever exceeds allocated, then allocated is set to the same as min_allocated. As long as min_allocated is less than allocated, then allocated does not change.

To relate this to the reality that is occurring, if a planned actual promise increases at a member, thus decreasing the forecast promises to the organization, and the adjustments do not cause change to the member seller's allocated values, then it implies that the member had already been allocated from the organizations' forecast promises, and then some of that allocation had simply been turned into reality (a forecast promise simply got consumed from an actual promise). That is traditional forecast consumption, though displaced down the organization-member hierarchy (which does not exist traditionally). Implementing the other fields of the forecast entry and the other events that can change the forecast entry fields can be accomplished similar to the above discussion.

Although the present invention has been described in detail, it should be understood that various changes, substitutions and alternations can be made hereto without departing from the spirit and scope of the invention as defined by the appended claims.

What is claimed is:

1. A system for allowing allocation of products among sellers, comprising:
   at least one computer having at least one or more processing unit;
   a hierarchy of at least two seller models, each representing a seller for a product having an associated product forecast model, the forecast model representing:
      forecasted sales of the product through each seller according to a commitment level for the seller and forecasted sales through other sellers in the hierarchy;
      planned supply of the product;
      customer orders for the product through each seller; and
      allocated supply of the product to each seller, representing the sum of promises from suppliers plus any customer promises;
   at least one supplier model operable to indicate to the seller models, according to the forecasted sales, promised supply of the product;
   at least one customer model operable to indicate to the seller models customer orders for the product; and
   wherein the system is operable to indicate to each seller in the hierarchy the allocated supply of the product to the seller.

2. The system of claim 1, wherein at least a portion of the allocated supply is designated as retained product not available to promise (ATP).

3. The system of claim 1, wherein the amount of product available to promise (ATP) at a seller for a forecast entry is determined according to an allocation policy.

4. The system of claim 3, wherein the amount may be reduced to zero according to the allocation policy.

5. The system of claim 3, wherein the allocation policy is selected from the group consisting of:
   a first-come-first-served policy;
   a per allocated policy;
   a per committed policy;
   a seller priority policy; and
   a predetermined split policy.

6. The system of claim 1, wherein the system is further operable to distribute the allocated supply according to an allocation policy.

7. The system of claim 1, wherein at least some of the allocated supply is distributed on a basis selected from the group consisting of:
   a first-come-first-served basis;
   a per allocated basis;
   a per committed basis;
   a seller priority basis; and
   a predetermined split basis.

8. The system of claim 1, further comprising:
   at least one specific product model representing a specific product and specifying the components of the specific product;
   a plurality of generic product models each representing a generic product and specifying one component of a plurality of possible components of the specific product; and
   wherein the system is further operable to provide a customer promise for the specific product according to the related generic products that are available to promise.

9. The system of claim 8, wherein generic-specific product relationships repeat throughout the seller hierarchy, there also being organization-member relationships between generic and specific products.

10. The system of claim 1, wherein the forecast model has:
an associated forecast period; and
an associated available to promise (ATP) period that is shorter than the forecast period.

11. The system of claim 1, wherein the forecast model is operable to reduce the forecasted sales and promised supply according to the customer orders without changing the allocated supply.

12. Software for allowing allocation of products among sellers, the software being embodied in a computer readable medium and when executed on a computer system operable to:
access a hierarchy of at least two seller models, each representing a seller for a product having an associated product forecast model, the forecast model representing:
forecasted sales of the product through each seller according to a commitment level for the seller and forecasted sales through other sellers in the hierarchy;
planned supply of the product;
customer orders for the product through each seller; and
allocated supply of the product to each seller, representing the sum of promises from suppliers plus any customer promises;
access at least one supplier model operable to indicate to the seller models, according to the forecasted sales, promised supply of the product;
access at least one customer model operable to indicate to the seller models customer orders for the product; and
indicate to each seller in the hierarchy the allocated supply of the product to the seller.

13. The software of claim 12, wherein at least a portion of the allocated supply is designated as retained product not available to promise (ATP).

14. The software of claim 12, wherein the amount of product available to promise (ATP) at a seller for a forecast entry is determined according to an allocation policy.

15. The software of claim 12, wherein the amount may be reduced to zero according to the allocation policy.

16. The software of claim 12, wherein the allocation policy is selected from the group consisting of:
a first-come-first-served policy;
a per allocated policy;
a per committed policy;
a seller priority policy; and
a predetermined split policy.

17. The software of claim 12, further operable to distribute the allocated supply according to an allocation policy.

18. The software of claim 12, wherein at least some of the allocated supply is distributed on a basis selected from the group consisting of:
a first-come-first-served basis;
a per allocated basis;
a per committed basis;
a seller priority basis; and
a predetermined split basis.

19. The software of claim 12, further operable to:
access at least one specific product model representing a specific product and specifying the components of the specific product;
access a plurality of generic product models each representing a generic product and specifying one component of a plurality of possible components of the specific product; and
provide a customer promise for the specific product according to the related generic products that are available to promise.

20. The software of claim 19, wherein generic-specific product relationships repeat throughout the seller hierarchy, there also being organization-member relationships between generic and specific products.

21. The software of claim 12, wherein the forecast model has:
an associated forecast period; and
an associated available to promise (ATP) period that it shorter than the forecast period.

22. The software of claim 12, wherein the forecast model is operable to reduce the forecasted sales and promised supply according to the customer orders without changing the allocated supply.

23. A computer-implemented method operating on at least one computer system for allowing allocation of products among sellers, the computer system comprising one or more processing units and one or more memory units, the method comprising:
using the computer system, representing at least two sellers in a hierarchy using corresponding seller models, each seller model representing a seller for a product having an associated product forecast model, the forecast model representing:
forecasted sales of the product through each seller according to a commitment level for the seller and forecasted sales through other sellers in the hierarchy;
planned supply of the product;
customer orders for the product through each seller; and
allocated supply of the product to each seller, representing the sum of promises from suppliers plus any customer promises;
using the computer system, indicating to the seller models, according to the forecasted sales and using at least one supplier model, promised supply of the product;
using the computer system, indicating to the seller models, using at least one customer model, customer orders for the product; and
using the computer system, indicating to each seller in the hierarchy the allocated supply of the product to the seller.

24. The method of claim 23, further comprising, using the computer system, designating at least a portion of the allocated supply as retained product not available to promise (ATP).

25. The method of claim 23, further comprising, using the computer system, determining the amount of product available to promise (ATP) at a seller for a forecast entry according to an allocation policy.

26. The method of claim 25, wherein the amount may be reduced to zero according to the allocation policy.

27. The method of claim 25, wherein the allocation policy is selected from the group consisting of:
a first-come-first-served policy;
a per allocated policy;
a per committed policy;
a seller priority policy; and
a predetermined split policy.

28. The method of claim 23, further comprising, using the computer system, distributing the allocated supply according to an allocation policy.

29. The method of claim 23, further comprising, using the computer system, distributing at least some of the allocated supply on a basis selected from the group consisting of:
- a first-come-first-served basis;
- a per allocated basis;
- a per committed basis;
- a seller priority basis; and
- a predetermined split basis.

30. The method of claim 23, further comprising, using the computer system:
- using at least one specific product model to represent a specific product, the specific product model specifying the components of the specific product;
- using a plurality of generic product models to represent a plurality of corresponding generic products, the generic product models each specifying one component of a plurality of possible components of the specific product; and
- providing a customer promise for the specific product according to the related generic products that are available to promise.

31. The method of claim 30, wherein generic-specific product relationships repeat throughout the seller hierarchy, there also being organization-member relationships between generic and specific products.

32. The method of claim 23, wherein the forecast model has:
- an associated forecast period; and
- an associated available to promise (ATP) period that is shorter than the forecast period.

33. The method of claim 23, further comprising, using the computer system, reducing the forecasted sales and promised supply within the forecast model, according to the customer orders, without changing the allocated supply.

* * * * *

(12) EX PARTE REEXAMINATION CERTIFICATE (7207th)
United States Patent
Kennedy et al.

(10) Number: US 7,085,729 C1
(45) Certificate Issued: Dec. 1, 2009

(54) SYSTEM AND METHOD FOR ALLOCATING MANUFACTURED PRODUCTS TO SELLERS

(75) Inventors: Brian M. Kennedy, Coppell, TX (US); Christopher D. Burchett, Carrollton, TX (US)

(73) Assignee: I2 Technologies US, Inc., Dallas, TX (US)

Reexamination Request:
No. 90/008,680, Jun. 1, 2007

Reexamination Certificate for:
Patent No.: 7,085,729
Issued: Aug. 1, 2006
Appl. No.: 09/504,247
Filed: Feb. 15, 2000

Related U.S. Application Data

(63) Continuation of application No. 08/802,434, filed on Feb. 18, 1997, now Pat. No. 6,167,380, which is a continuation-in-part of application No. 08/491,167, filed on Jun. 16, 1995.

(51) Int. Cl.
*G06F 15/00* (2006.01)

(52) U.S. Cl. .......................................... 705/10
(58) Field of Classification Search ................ 705/10
See application file for complete search history.

(56) References Cited

U.S. PATENT DOCUMENTS

| 5,311,424 A | 5/1994 | Mukherjee et al. |
| 5,450,317 A | 9/1995 | Lu et al. |

FOREIGN PATENT DOCUMENTS

EP 0458284 11/1991

OTHER PUBLICATIONS

Andre J. Martin, "Distribution Resource Planning," Production and Inventory Control Handbook, 2d ed., 1987, pp. 22.1–22.36.

John C. LaBella et al., "Logistics Planning with Customer Demand Factors," 30th Annual International Conference Proceedings, (1987).
SAP AG, "RV System Screen Procedures Master Data," Functional Documentation V04.2/1 (Jan. 1, 1994).
Andre J. Martin, "DRP in Nonmanufacturing Environments: Retailers, Wholesalers and Distributors," DRP: Distribution Resource Planning; Distribution Management's Most Powerful.
Robert Goodell Brown, Materials Management, A Modular Library (1977).
Donald W. Fogarty et al., Production and Inventory Management (1983).
Robert Goodell Brown, Decision Rules for Inventory Management (1967).
Paul Deis, Production & Inventory Management in the Technological Age (1983).

(Continued)

*Primary Examiner*—Matthew C. Graham

(57) ABSTRACT

A software system is provided for managing available to promise (ATP) and making promises to fulfill customer requests. The software system includes a plurality of generic product models (600) each representing a generic product. Each generic product model (600) specifies one component of a plurality of possible components. A plurality of specific product models (602) each represent a specific product and each specify all components of the specific product. Each component specified by each specific product model (602) is specified by one of the generic product models (600) such that each specific product model (602) is related to a subset of the generic product models (600). A customer request matching a specific product then can be fulfilled by available-to-promise of the specific product or by available-to-promise of all related generic products. In addition, an organization in a seller hierarchy can retain product and designate first-come-first-served product. The organization also can define an ATP horizon to specify when forecasted product is actually available. Further, the organization can use an automatic allocation policy to allocate to members, and some forecast entries can be designated zero-ATP entries.

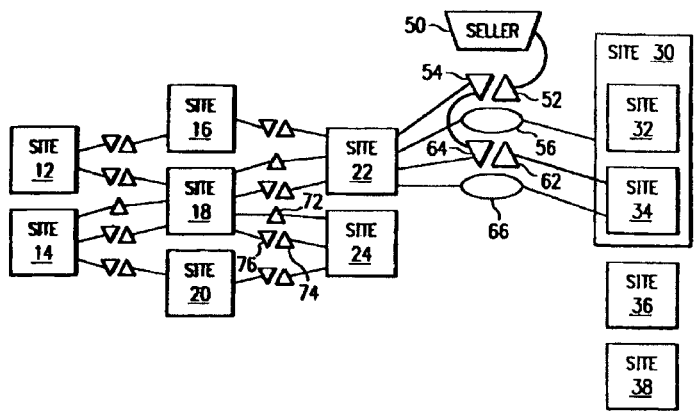

OTHER PUBLICATIONS

Oliver W. Wright, MRP II: Unlocking America's Productivity Potential (1981).

Gary Eppen et al., "Centralized Policies in a Multi–Warehouse System with Lead Times and Random Demand," Multi–Level Production/Inventory Control Systems: Theory and Practice.

Harry J. Mosesian et al., "DRP: A Planning Tool . . . And Much More," APICS International Conference Proceedings (1988).

W. Stephen Beversluis et al., "Using a Spreadsheet for Capacity Planning and Scheduling," Production and Inventory Management Journal (1995).

Christopher Gopal et al., "Information Technology and Integrated Distribution," Integrated Distribution Management (1993).

Joseph G. Ormsby et al., "The Role of Marketing in Material Requirements Planning Systems," Industrial Marketing Management, vol. 20, No. 1 (1991).

Yasuhiro Monden, Toyota Production System: Practical Approach to Production Management (1983).

Thomas E. Vollman et al., Manufacturing Planning and Control Systems (1984).

Jayashankar M. Swaminathan et al., "Modeling the Dynamics of Supply Chains," (1995).

Daphne Perry et al., "Imagineering the Future of Continuous Replenishment in the Food Industry: A Canadian Perspective," American Production and Inventory Control System (1995.

SAP AG, "Sales SD 030," R/3 System, Release 2.2 (Oct. 1994).

Kurt Salmon Associates, Inc., "Efficient Replenishment," Efficient Consumer Response, Enhancing Consumer Value in the Grocery Industry (1993).

SAP AG, "RV System Course RV011 Customer Order Processing," Release 5.0 (Feb. 1, 1992).

Stephen DeLurgio et al., Forecasting Systems for Operations Management (1991).

Andre J. Martin, Distribution Resource Planning: The Gateway to True Quick Response and Continous Replenishment (1993).

Peter Clay, "Advanced Available–to–Promise Concepts and Techniques," reprinted from 1990 APICS Conference Proceedings, Master Planning Reprints (revised 1993).

John K. Coltman, "Production Planning in an International Multiplant, Multiwarehouse Environment," American Production and inventory Control Society 1985 Conference Proceeding.

Kenneth L. Campbell, "From Forecast to the Master Production Schedule in a Multi–Plant, Multi–Level Product Environment," reprinted from APICS 1984 Conference Proceedings: Rea.

Awi Federgruen et al., "Approximations of Dynamic, Multilocation Production and Inventory Problems," Management Science, vol. 30, No. 1 (Jan. 1984).

Andrew J. Clark, "An Informal Survey of Multi–Echelon Inventory Theory," Naval Research Logistics Quarterly, vol. 19, No. 4 (Dec. 1972).

Donald M. Topkis, "Optimal Ordering and Rationing Policies in a Nonstationary Dynamic Inventory Model with n Demand Classes," Management Science, vol. 15, No. 3 (1968.

SAP AG, "SD Sales Guide," R/3 System, Release 2.1–2.2 (Sep. 1994).

SAP AG, "SD Sales Information System," R/3 System, Release 2.0–2.2 (Jul. 1994).

SAP AG, "RV System Screen Procedures Sales," Functional Documentation V04.2/3 (Jan. 1, 1994).

SAP AG, "SD Sales Guide," R/3 System, Release 2.0 (Jul. 1993).

i2 Technologies, Inc., "Rhythm Intelligent Planning & Scheduling Systems—Interplant Manual", Jan. 19, 1995, USA.

i2 Technologies, "Rhythm Intelligent Planning & Scheduling Systems—User's Manual", Apr. 6, 1995, Version 2.7, USA.

i2 Technologies, Inc., "Rhythm Intelligent Planning & Scheduling Systems—Reference Manual", Apr. 6, 1995, Version 2.7, USA.

i2 Technologies, Inc., "Rhythm Intelligent Planning & Scheduling Systems—Tutorial Manual (Master Production Planner & Scheduler)" Feb. 24, 1994, Version 2.5, USA.

i2 Technologies, Inc., "Rhythm Intelligent Planning & Scheduling Systems—User's Manual (Master Production Planner & Scheduler)", Feb. 7, 1994, Version 2.5, USA.

i2 Technologies, Inc., "Rhythm Intelligent Planning & Scheduling Systems—Interplant Manual", Mar. 30, 1994, Version 2.5, USA.

i2 Technologies, Inc., "Rhythm Intelligent Planning & Sceduling Systems—Rhythm Factory Planner User's Manual", Dec. 9, 1996, Version 2.9, USA.

i2 Technologies, Inc., "Rhythm Intelligent Planning & Sceduling Systems—Tutorial Manual", Jan. 31, 1996, Version 2.8, USA.

i2 Technologies, "Rhythm Intelligent Planning & Scheduling Systems—Tutorial Manual (Master Production Planner & Schedule)", Jan. 26, 1995, Version 2.7, USA.

i2 Technologies, "Rhythm Intelligent Planning & Scheduling Systems—User's Manual (Master Production Planner & Schedule)", Mar. 13, 1996, Version 2.8, USA.

i2 Technologies, Inc., "Rhythm Intelligent Planning & Scheduling Systems—Rhythm Factory Planner Reference Manual", Dec. 9, 1996, USA.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7, 10, 12–18, 21, 23–29 and 32 is confirmed.

Claims 8, 9, 11, 19, 20, 22, 30, 31 and 33 were not reexamined.

* * * * *